US010496577B2

United States Patent
Pirotti et al.

(10) Patent No.: US 10,496,577 B2
(45) Date of Patent: Dec. 3, 2019

(54) DISTRIBUTION OF MASTER DEVICE TASKS AMONG BUS QUEUES

(71) Applicant: HEWLETT PACKARD ENTERPRISE DEVELOPMENT LP, Houston, TX (US)

(72) Inventors: Rodolfo Pirotti, Porto Alegre (BR); Vicente Carvalho, Porto Alegre (BR); Francisco Barreto, Porto Alegre (BR)

(73) Assignee: Hewlett Packard Enterprise Development LP, Houston, TX (US)

( * ) Notice: Subject to any disclaimer, the term of this patent is extended or adjusted under 35 U.S.C. 154(b) by 195 days.

(21) Appl. No.: 15/428,319

(22) Filed: Feb. 9, 2017

(65) Prior Publication Data
US 2018/0225242 A1    Aug. 9, 2018

(51) Int. Cl.
| G06F 13/00 | (2006.01) |
| G06F 13/366 | (2006.01) |
| G06F 9/48 | (2006.01) |
| G06F 13/364 | (2006.01) |
| G06F 11/20 | (2006.01) |

(52) U.S. Cl.
CPC ............ *G06F 13/366* (2013.01); *G06F 9/485* (2013.01); *G06F 9/4881* (2013.01); *G06F 11/2007* (2013.01); *G06F 13/364* (2013.01)

(58) Field of Classification Search
None
See application file for complete search history.

(56) References Cited

U.S. PATENT DOCUMENTS

| 4,972,313 A | 11/1990 | Getson, Jr. et al. |
| 4,979,099 A | 12/1990 | Milia et al. |
| 5,191,656 A | 3/1993 | Forde et al. |
| 5,230,044 A | 7/1993 | Cao et al. |
| 5,237,695 A | 8/1993 | Skokan et al. |
| 5,237,696 A | 8/1993 | Best |
| 5,392,436 A | 2/1995 | Jansen et al. |
| 5,418,920 A | 5/1995 | Kuddes |
| 5,572,686 A | 11/1996 | Nunziata et al. |
| 5,596,729 A | 1/1997 | Lester et al. |
| 5,719,882 A * | 2/1998 | Ellis .................... H04L 41/0213 709/237 |
| 5,875,342 A | 2/1999 | Temple |

(Continued)

FOREIGN PATENT DOCUMENTS

GB    2475897    6/2011

OTHER PUBLICATIONS

Chaskar et al., "Fair Scheduling With Tunable Latency: A Round-Robin Approach," Aug. 2003, EEE/ACM Transactions on Networking, vol. 11, No. 4, pp. 592-601.

(Continued)

*Primary Examiner* — Henry Tsai
*Assistant Examiner* — Dean Phan
(74) *Attorney, Agent, or Firm* — Hewlett Packard Enterprise Patent Department

(57) ABSTRACT

Examples include the distribution of master device tasks among bus queues. Some examples include distribution of a plurality of tasks of a master device among a plurality of bus queues, each for a respective one of a plurality of busses of a computing system, selection of an arbitration timeout time for a task at a front of one of the bus queues, and a request for access to one of the busses from a bus arbiter.

18 Claims, 4 Drawing Sheets

(56) References Cited

U.S. PATENT DOCUMENTS

| | | |
|---|---|---|
| 5,937,199 A | 8/1999 | Temple |
| 6,006,289 A | 12/1999 | James et al. |
| 6,157,978 A | 12/2000 | Ng et al. |
| 6,205,524 B1 | 3/2001 | Ng |
| 6,311,232 B1 | 10/2001 | Cagle et al. |
| 6,385,678 B2 | 5/2002 | Jacobs et al. |
| 6,473,424 B1 | 10/2002 | DeJager et al. |
| 6,671,275 B1 | 12/2003 | Wong et al. |
| 6,738,923 B1 | 5/2004 | Blam et al. |
| 6,895,459 B2 | 5/2005 | Hadwiger et al. |
| 7,024,492 B2 | 4/2006 | Fussell et al. |
| 7,096,289 B2 | 8/2006 | Brown et al. |
| 7,380,040 B2 | 5/2008 | Sarkar et al. |
| 7,487,276 B2 | 2/2009 | Nicholas |
| 7,555,005 B2 | 6/2009 | Sarkar |
| 7,908,416 B2 | 3/2011 | Kato et al. |
| 8,572,322 B2 | 10/2013 | Xu et al. |
| 8,892,716 B2 | 11/2014 | Gulati et al. |
| 9,164,849 B2 | 10/2015 | Hari et al. |
| 2002/0052996 A1 | 5/2002 | Jahnke et al. |
| 2002/0065988 A1* | 5/2002 | Lasserre ............... G06F 1/206 711/122 |
| 2003/0131168 A1 | 7/2003 | Kauffman et al. |
| 2003/0198238 A1 | 10/2003 | Westby |
| 2003/0214952 A1* | 11/2003 | Novick ............. H04L 12/5601 370/395.42 |
| 2004/0022263 A1 | 2/2004 | Zhao et al. |
| 2005/0157865 A1 | 7/2005 | Yeager et al. |
| 2005/0188139 A1 | 8/2005 | Fujiwara et al. |
| 2006/0056293 A1 | 3/2006 | Kumagai et al. |
| 2007/0067531 A1 | 3/2007 | Kolinummi et al. |
| 2007/0256081 A1 | 11/2007 | Comer |
| 2008/0049254 A1 | 2/2008 | Phan et al. |
| 2009/0006889 A1 | 1/2009 | Holdaway et al. |
| 2009/0287898 A1 | 11/2009 | Hara |
| 2010/0064072 A1 | 3/2010 | Tang et al. |
| 2010/0095036 A1 | 4/2010 | Mittal et al. |
| 2010/0211815 A1 | 8/2010 | Mankovskii et al. |
| 2010/0318706 A1 | 12/2010 | Kobayashi |
| 2011/0238941 A1 | 9/2011 | Xu et al. |
| 2011/0320706 A1 | 12/2011 | Nakajima |
| 2012/0179850 A1 | 7/2012 | Johas Teener |
| 2013/0111090 A1* | 5/2013 | Miller ................ G06F 13/1663 710/240 |
| 2014/0310444 A1 | 10/2014 | Aldis et al. |
| 2014/0358858 A1 | 12/2014 | Camble et al. |
| 2016/0092108 A1 | 3/2016 | Karaje et al. |
| 2016/0092272 A1 | 3/2016 | Karaje et al. |
| 2016/0179404 A1 | 6/2016 | Nanduri et al. |
| 2016/0291885 A1 | 10/2016 | Pendharkar et al. |
| 2017/0010919 A1 | 1/2017 | Yerfule et al. |
| 2017/0017524 A1 | 1/2017 | Karaje et al. |
| 2017/0041404 A1 | 2/2017 | Burbridge |
| 2017/0132040 A1 | 5/2017 | Yerfule et al. |
| 2017/0177221 A1 | 6/2017 | Trehan et al. |

OTHER PUBLICATIONS

Wikipedia, "Scheduling (computing)," Jul. 16, 2014, <https://en.wikipedia.org/w/index.php?title=Scheduling_(computing)&oldid=617115950>.

Extended European Search Report in EP Application No. 17207606.9, dated May 24, 2018, 5 pages.

Cadence Design Systems, Inc., "Advanced High-performance Bus Controller (AHBC) IP," (Research Paper), Systems and Peripherals Datasheet, Jul. 2014, 2 pages, <http://ip.cadence.com/uploads/480/Cadence_AHBC_ds-pdf>.

Free Electrons, "GPIO-based I2C Arbitration Using a Challenge & Response Mechanism," Jan. 19, 2017, Linux Cross Reference, <http://lxr.free-electrons.com/source/Documentation/devicetree/bindings/i2c/12c-arb-gpio-challenge.txt?v=3.16>.

Lattice Semiconductor Corp., "Arbitration and Switching Between Bus Masters," Feb. 2010, <http://www.latticesemi.com/~/media/LatticeSemi/Documents/ReferenceDesigns/1D/ArbitrationandSwitchingBetweenBusMasters-Documentation.PDF?document_id=36070>.

NXP Semiconductors N.V., "PCA9641 2-channel I2C-bus master arbiter," Oct. 27, 2015, Product data sheet, <http://www.nxp.com/documents/data_sheet/PCA9641.pdf>.

Wikipedia, "I$^2$C," Dec. 30, 2016, <https://en.wikipedia.org/w/index.php?title=I%C2%B2C&oldid=757411150>.

* cited by examiner

DISTRIBUTION OF MASTER DEVICE TASKS AMONG BUS QUEUES

BACKGROUND

A computing system may include a bus, such as an inter-integrated circuit ($I^2C$) bus or a two wire interface (TWI) bus, to connect different devices within the computing system. In such examples, an initiating device (which may be referred to herein as a "master" device) may use the bus to communicate with another device (which may be referred to herein as a "slave" device) to perform tasks for the computing system. In some examples, multiple master devices may be connected to the same bus with one master being able to use the bus at a given time. In such examples, a bus arbiter may be used to arbitrate access to the bus among the master devices.

BRIEF DESCRIPTION OF THE DRAWINGS

The following detailed description references the drawings, wherein.

DETAILED DESCRIPTION

Figure 1:
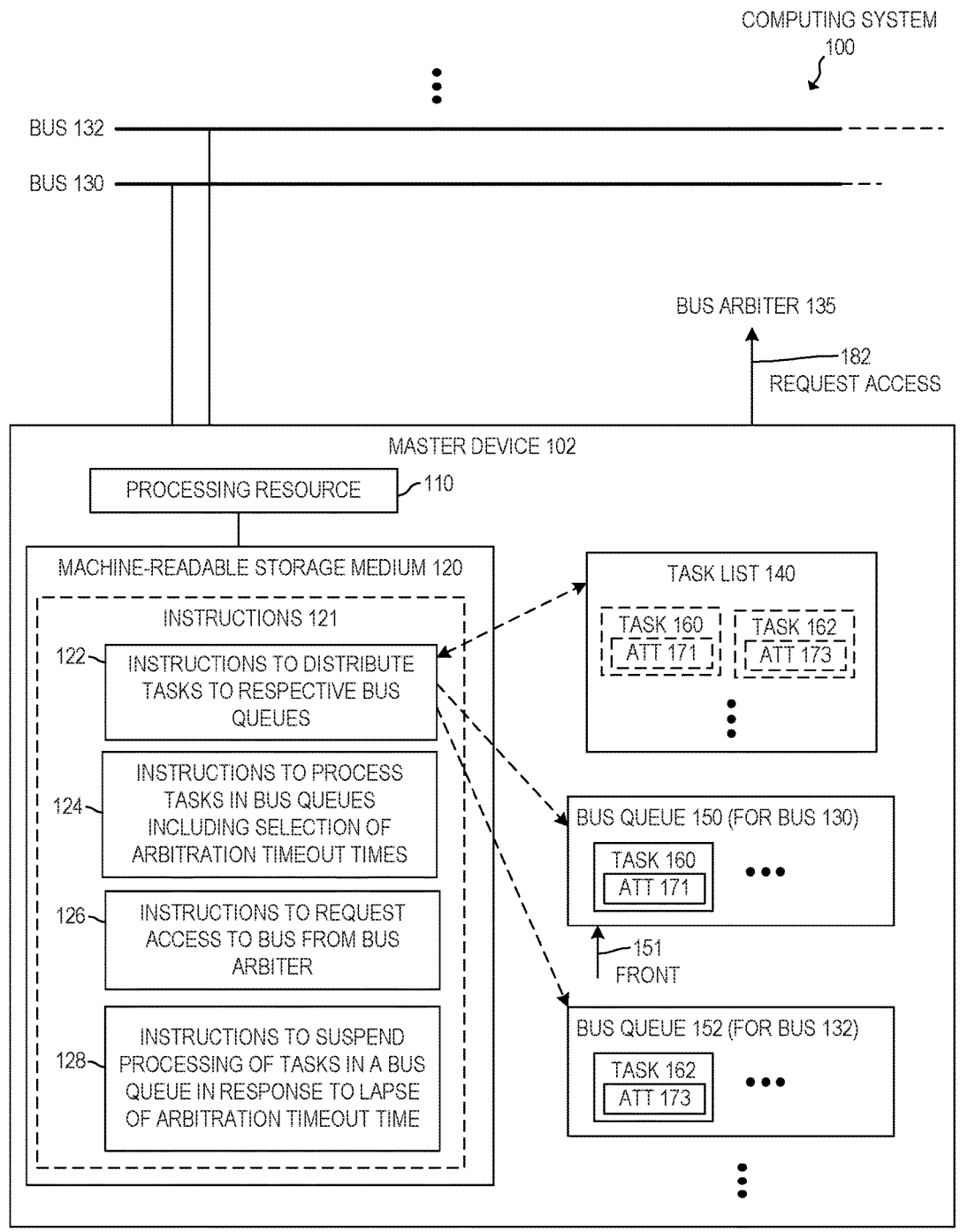
FIG. 1 is a block diagram of an example computing system including a master device to distribute tasks among a plurality of bus queues for respective busses of the computing system.

As noted above, in some examples, a bus arbiter may be used to arbitrate access to a bus among a plurality of master devices having access to the bus in a computer system. In such examples, for each master device, before accessing a bus, the master device provide a request to the bus arbiter to request access to the bus, and then wait to see whether the bus arbiter grants it access to the bus. In such examples, a master device may wait for an answer from the bus arbiter for a predetermined length of time, which may be referred to herein as an "arbitration timeout time". If the master device does not receive access to the bus from the bus arbiter within the arbitration timeout time after making the request, then the master device may determine that it did not get access to the bus.

In some examples, the arbitration timeout time may be set to a large value enough to allow enough time for any other master device currently using the bus at the time of the request to complete its transaction, so that the bus arbiter may then give access to the requesting master device before the arbitration timeout time lapses. In such examples, the arbitration timeout time lapses may be set to a fixed time that is based on or approximately the worst-case time that any master device may take to complete a transaction involving the bus. However, this may lead to master devices waiting idly for extended periods of time after requesting access to a bus.

To address these issues, in examples described herein, a master device of a computing system may take its tasks that involve bus access and distribute those tasks among respective bus queues that are each dedicated to storing tasks for a different bus in the computing system. Examples may further include selection of an appropriate arbitration timeout time for each task based on attributes of the task, and move from one of the bus queues to the next, beginning processing of a task at the front of each bus queue each time a respective queue is accessed. In such examples, when a selected arbitration timeout time for a task at the front of one of the bus queues lapses without the master device receiving requested access to the bus for that task, then the master device may suspend processing of tasks in that bus queue, and move to a next bus queue.

For example, a master device may distribute tasks among a plurality of bus queues, each for a respective one of the busses in the computer system. After the distribution, the master device begin processing a first task at a front of a first bus queue with selection of a first arbitration timeout time for the first task based on attributes of the first task. The master device may then request access to the first bus from a bus arbiter for the first task. In response to a determination that the selected first arbitration timeout time has lapsed without the master device receiving the requested access to the first bus from the bus arbiter, the master device may suspend processing of any tasks in the first bus queue, and begin processing a second task at the front of a second bus queue (for a second bus) with selection of a second arbitration timeout time for the second task and request access to the second bus from the bus arbiter for the second task.

In this manner, in examples described herein, when a given master device requests a first bus that is in use by another master device (i.e., busy), the given master device may jump to another queue with task(s) for another bus and attempt to gain access to another bus instead of idly waiting for an extended amount of time (e.g., a timeout period based on a worst-case scenario) for access to the first bus that is current in use. Such examples may have positive results as, if the first bus is busy, the chances of another bus also being busy are less, since the other bus is not occupied by the same master device that is occupying the first bus. Also, in examples where there are a greater number of busses than masters, at least one of the busses may be free at any given time. Such examples may improve bus utilization by attempting to use different busses in parallel, reduce master device waiting time by attempting to find an available bus to use rather than waiting an extended time for a busy bus. In this manner, examples described herein may avoid idle periods in both busses of a computing system and in the master devices of the computing system.

Referring now to the drawings, FIG. 1 is a block diagram of an example computing system 100 including a master device 102 to distribute tasks among a plurality of bus queues for respective busses of computing system 100. In the example of FIG. 1, computing system 100 may be implemented by at least one computing device. In some examples, the computing system 100 may be (or may be included in) a storage enclosure to house and manage storage drives (or other storage devices). In some examples, a storage enclosure including or implementing computing system 100 may be a storage enclosure of a storage array, the storage enclosure to house a plurality of storage drives (e.g., hard-disk drives (HDDs), solid-state drives (SSDs), or a combination thereof) and an array controller to manage the utilization of the storage drives together as a storage array (e.g., under the control of the array controller).

In the example of FIG. 1, computing system 100 may include a plurality of busses (e.g., I²C busses or TWI busses) useable by a master device 102. Master device 102 may be connected directly or indirectly (e.g., via a multiplexer, etc.) to the plurality of busses such that master device 102 is able to communicate via the busses with other device (e.g., slave devices) connected to the busses. The plurality of busses may include a first bus 130 and a second bus 132, and master device 102 may be connected to each of the first and second busses 130 and 132 as described above.

In examples described herein, a master device may be any suitable computing device for operating as a master device, including using busses of a computing system to communicate with slave devices connected to those busses. For example, a master device may include one or more integrated circuits to carry out functionalities described herein. In some examples, a master device herein may be a microcontroller. In some examples, a master device herein may be single-threaded (e.g., utilizing a single processing thread of execution).

In the example of FIG. 1, master device 102 may be a microprocessor or other computing device connected to busses of computing system 100 (e.g., busses 130, 132, etc.) to communicate with slave devices connected to those busses. Master device 102 may include at least one processing resource 110, and at least one machine-readable storage medium 120 comprising (e.g., encoded with) instructions 121 that are executable by the at least one processing resource 110 to implement functionalities described herein in relation to FIG. 1. Instructions 121 may include at least instructions 122, 124, 126, and 128, as shown in FIG. 1. In some examples, instructions 121 (including at least instructions 122, 124, 126, and 128) may implement a bus scheduler for master device 102.

In examples described herein, the plurality of busses usable by master device 102 (e.g., including busses 130 and 132) may each be used by one master device of computing system 100 at a time. In such examples, a bus arbiter of computing system 100 may arbitrate between master devices of computing system 100 to implement the one at a time access policy for the busses. For example, computing system 100 may include a bus arbiter 135 to perform the arbitration. Bus arbiter 135 may be implemented by a hardware component (e.g., electronic circuitry), a programmable logic device (PLD), a field-programmable gate array (FPGA), or the like, or by any other suitable component(s). In some examples, bus arbiter 135 may communicate with master device 102 and other master devices of computing system 100 via communication channels (e.g., traces, wires, etc.) separate from the busses on which the master devices may communicate with the slave devices. In such examples, the master devices may communicate out-of-band with bus arbiter 135 (i.e., via channel(s) other than the busses).

In examples described herein, each master device is able to independently request access to a specified bus from bus arbiter 135, and bus arbiter 135 is able to decide whether to grant each received request (e.g., based on whether the requested bus is free, based on other requests received, etc.). In response to a request from a master device, bus arbiter is able to decide whether to grant the request, and provide a response granting the bus access to (or a lock on) the requested bus to a requesting master device (when appropriate). In some examples, a bus arbiter may be able to provide a response indicating that the master device is not granted access to (or a lock on) the requested bus (when appropriate). The form of these responses may take any suitable form (e.g., a token for granting a lock on the bus, or the like).

In the example of FIG. 1, master device 102 may include a task list 140 to store tasks that are each to be performed using one of the busses of computing system 100 (e.g., busses 130, 132, etc.). In some examples, task list 140 may be stored in memory of master device 102, such as on storage medium 120 or in at least one other machine-readable storage medium of master device 102. Master device 102 (e.g., instructions 121 and/or other instructions of storage medium 120 executed by processing resource 110) may store tasks to be performed in task list 140. For example, master device 102 may store, in task list 140, various task(s) to read from, write to, or otherwise access or execute any operation on respective slave device(s) of computing system 100. In some examples, master device 102 may receive a request from another component of computing system 100 to perform a task involving accessing a slave device, and master device may store a corresponding task for such a request in task list 140. In some examples, master device 102 may store a plurality of tasks in task list 140 at boot time for master device 102. In examples described herein, slave devices may include any devices of a computing system that a master device 102 may access via busses (e.g., I²C or TWI busses) of the computing system. Some examples of slave devices may include temperature sensors, NVRAM memory devices, power supplies, fan modules, rack sensors (e.g., memories); pressure sensors, or any other suitable devices (e.g., memories, sensors, etc.). In such examples, tasks of task list 140 may include various different types of tasks based on the type of slave device involved, such as reading a temperature value from a temperature sensor slave device, or setting a real-time clock in another type of slave device.

In the example of FIG. 1, master device 102 may include a plurality of bus queues, each for a respective one of the busses useable by master device 102 to communicate with slave devices in computing system 100. For example, in the example of FIG. 1, the busses of computing system 100 usable by master device 102 may include a first bus 130 and a second bus 132, and master device 102 may include a first bus queue 150 for first bus 130 and a second bus queue 152 for second bus 132. In examples described herein, a bus queue "for" a given bus may be a bus queue that is dedicated to storing exclusively tasks that are to be executed on the given bus. For example, bus queue 150 may be dedicated to storing exclusively tasks to be executed on corresponding bus 130, and bus queue 152 may be dedicated to storing exclusively tasks to be executed on corresponding bus 132. For purposes of explanation, example of FIG. 1 shows two busses 130 and 132 and two bus queues of master device 102 for those two busses, respectively. However, in other examples, computing system 100 may include more than two busses useable by master device 102, as described above, and in such examples, master device may include a different respective bus queue for each of those busses (e.g., four bus queues for four busses, five bus queues for five busses, etc.). In some examples, each of the bus queues may be stored in memory of master device 102, such as on storage medium 120 or in at least one other machine-readable storage medium of master device 102. Each of the bus queues may be implemented by a suitable data structure (e.g., a first-in-first-out (FIFO) data structure) and, when not empty, may have a task at a front of the queue which is the next task to be removed from the queue. As described below, tasks in the bus queues may be sorted.

In examples described herein, a task may be implemented by any suitable data structure, and may include at least one command (such as code or other machine-readable information usable to cause a task to be performed) and a plurality of attributes. For example, in the example of FIG. 1, master device 102 may store in task list 140 a task 160 including at least one command and attributes 171, and a task 162 including at least one command and attributes 173. Although two tasks are shown in task list 140 for explanatory purposes, task list 140 may include more than two tasks (e.g., any suitable number of tasks).

In examples described herein, the attributes of a task may include, for example, a bus identifier, a state, a wait time, a priority, a retry status, a task type, or any combination thereof. A bus identifier attribute of a task may indicate which bus is to be used to perform the task (e.g., which bus is usable to communicate with the appropriate slave device to perform the task.). A state attribute of a task may indicate whether the task is ready to be distributed to a bus queue for processing. For example, the state attribute may be either a "wait" value (i.e., a "wait state" herein) indicating that the task is not currently ready to be distributed to a bus queue and processed by the master device using a bus, or a "ready" value (i.e., a "ready state" herein) indicating that the task is currently ready to be distributed to a bus queue and processed by the master device using a bus. A wait time attribute of a task may indicate an amount of time until the task is ready to transition from the wait state to the ready state for distribution and processing. A priority attribute may indicate a relative priority of the task. For example, the priority attribute may have a "high" priority value or a "low" priority value (or any other suitable number of relative priority values). A retry status attribute may indicate a number of times (e.g., 0 or more) that the appropriate bus has been requested for the task from the bus arbiters without the master device receiving access to the bus for the task. A task type attribute may indicate whether the task is a periodic task (to be executed repeatedly according to a certain period), a one-attempt task (to be attempted current a single scheduling period and not rescheduled if unsuccessful), or a one-completion task (to be re-tried until it successfully completes). Periodic tasks may further have a periodic time attribute indicating how often the task is to be scheduled for performance (e.g., every 500 milliseconds (ms), or any other suitable time).

As an example, instructions 122 may set the attributes of tasks as part of a process of storing the tasks in task list 140. For example, instructions 122 may store task 160 in task list 140 with attributes 171, which include attributes indicating a wait state, a wait time of 200 ms, a priority of high, a retry status of 0, a periodic task type, and a period of 500 ms. As a further example, instructions 122 may store task 162 in task list 140 with attributes 173, which include attributes indicating a wait state, a wait time of 200 ms, a priority of low, a retry status of 0, and a one-attempt task type.

Instructions 122 may periodically adjust or refresh the wait time attribute of each task in task list 140 of master device 102 based on the lapsed time since the last refresh of the wait time attributes. For example, when instructions 122 adjust the wait times, instructions 122 may determine that 100 ms have elapsed since the last adjustment, and accordingly reduce each of the wait times by 100 ms. In the example above, that would give each of tasks 160 and 162 a new wait time attribute of 100 ms. Since the wait times are still greater than 0, instructions 122 may determine not to change the wait state to the ready state for either of tasks 160 and 162. At a next periodic adjustment, instructions 122 may again adjust the wait time attributes based on elapsed time as described above. For example, instructions 122 may adjust the wait times by reducing them by 100 ms again, thereby adjusting the wait times of tasks 160 and 162 to 0. In such examples, instructions 122 may detect that the wait times of tasks 160 and 162 are 0 and, in response, may change the task state from the wait state to the ready state for each of tasks 160 and 162. Instructions 122 may similarly update wait times and change states for any other tasks of task list 140.

In the example described above, after the adjustments, instructions 122 may determine that a plurality of tasks of task list 140 each have an attribute indicating that the task is currently ready for distribution to bus queues and processing (e.g., may have a state attribute indicating the ready state). In response to the determination, instructions 122 may distribute this plurality of tasks of the master device among the plurality of bus queues of master device 102. In some examples, other tasks of task list 140 may not have attributes indicating that they are ready for distribution and processing (e.g., having the wait state attribute have instead of the ready state attribute), and instructions 122 may leave these tasks in task list 140 rather than distributing them among the bus queues with the determined plurality of tasks (e.g., having the ready state attribute).

In some examples, to distribute the determined plurality of tasks of task list 140, instructions 122 may remove each of the tasks from the task list 140 and store them in appropriate bus queues based on the bus identifier attributes of the tasks. For example, for each task of the determined plurality of tasks, instructions 122 may access the bus identifier attribute of the task, remove the task from task list 140, and insert it into the bus queue for the bus indicated by the bus identifier attribute. Continuing the example described above where tasks 160 and 162 of FIG. 1 are determined to be ready for distribution, instructions 122 may determine that the attributes 171 of task 160 include a bus identifier indicating the first bus 130. In response, instructions 122 may store task 160 in first bus queue 150 for first bus 130, as illustrated in FIG. 1. Instructions 122 may determine that the attributes 173 of task 162 include a bus identifier indicating the second bus 132 and in response may store task 162 in second bus queue 152 for first bus 132, as illustrated in FIG. 1. Although distribution of two tasks among two bus queues has been described herein in relation to FIG. 1 for explanatory purposes, more than two tasks of task list 140 may be distributed among two or more bus queues as described above.

In some examples, after the distribution of the plurality of tasks among the bus queues, and prior to beginning processing of any tasks distributed to the bus queues task, instructions 122 may sort the tasks in each of the bus queues. For example, for each of the bus queues to which any of the plurality of tasks have been distributed, instructions 122 may sort the tasks distributed to that respective bus queue based on the respective priority attributes of the tasks. For example, instructions 122 may sort the tasks distributed to first bus queue 150 such that any tasks with a high priority attribute appear before (i.e., closer to the front of the bus queue) than any tasks of the bus queue with a low priority attribute. Instructions 122 may perform similar sorting for each of the bus queues after the distribution, and when other priority attribute values are used, may sort such that tasks with higher priorities are closer to the front than tasks with lower priority values.

After the distribution and the sorting, instructions 121 may iterate through all of the bus queues of master device 102 in a defined sequence a plurality of times, accessing each bus queue in turn and, at each non-empty bus queue, requesting access to the appropriate bus from bus arbiter 135 for the task at the front of the bus queue. In such examples, when the bus access is granted, instructions 121 may cause the task to be executed and then removed from the bus queue, thereby promoting another task in that bus queue (if any) to the front of the bus queue. After removing the task, instructions 121 may advance to accessing the next bus queue in the sequence. Also in such examples of iteratively accessing the bus queues in sequence, when master device 102 fails to obtain the requested bus access for a task at the front of an accessed bus queue within a selected arbitration timeout time for the task (as described below), then instructions 121 may suspend processing of all tasks in that bus queue, and advance to accessing the next queue in the sequence. In some examples, instructions 121 may iterate through the bus queues in the defined sequence any suitable number of times (e.g., a predetermined number of times). The iteration may include instructions 121 advancing in a loop from the last bus queue in the sequence to the first bus queue in the sequence (when the number of total loops is not complete). Aspects of the above process are described in some further detail below.

For example, after the distribution of tasks among bus queues and the sorting of the tasks in the respective bus queues, as described above, instructions 124 may access first bus queue 150 and begin processing of a first task 160 at a front 151 of first bus queue 150. In such examples, beginning processing of first task 160 may include selection of a first arbitration timeout time for first task 160, based on attributes 171 of the first task.

In examples described herein, an arbitration timeout time may be a predetermined amount of time that a master device may wait to receive a response from a bus arbiter granting access to a bus in response to a request, from the master device to the bus arbiter, for access to the bus for a given task. The arbitration timeout time may be an amount of time that a master device may wait for the requested access for a given task before ceasing processing of the given task and moving on to access another bus queue not including the given task. In some examples, the arbitration timeout time may define an amount of time for a master device to wait, after a single bus access request, for the bus arbiter to grant the bus access requested via the single bus access request, and before beginning the substance of the task itself (i.e., the arbitration timeout time is not a timeout time for completion of the substance of the task itself). In examples described herein, after requesting access to a bus for a given task from a bus arbiter, the master device may wait for the arbitration timeout time to be granted the requested bus access without processing any other task or doing other work apart from monitoring for the lapse of the arbitration timeout time since the bus access request. In some examples, being granted access to a bus may be referred to as obtaining a lock on the bus.

In other examples, the arbitration timeout time may define an amount of time for a master device to wait for the bus arbiter to grant bus access requested for a single task, when one or more requests for the bus are provided from one master device to the bus arbiter for a single task. For example, a bus arbiter may be able to provide a response denying a requested bus access. In such examples, a master device (e.g., instructions 126 of master device 102) may request the bus again from the bus arbiter in response to the denial and before the arbitration timeout time has lapsed from the time of the first request. In some examples, the master device (e.g., instructions 126 of master device 102) may request the bus two or more times in response to denials and before the arbitration timeout time has lapsed from the time of the first request. In such examples, master device may cease to wait for the access to be granted after lapse of the arbitration timeout time from the first request for a task (regardless of how many requests were provided to the bus arbiter for the task).

Returning to the example of FIG. 1, as noted above, instructions 124 may begin processing of first task 160 at a front 151 of first bus queue 150 with selection of a first arbitration timeout time for first task 160, based on attributes 171 of the first task. That is, the processing of first task 160 may include instructions 124 selecting an arbitration timeout time for first task 160. In some examples, a greater arbitration timeout time may provide greater chances of receiving access to a bus, but may also increase time spent waiting in which other tasks are not being performed. As such, in examples described herein, instructions 124 may select appropriate arbitration timeout times for tasks based on attributes of the tasks. In examples described herein, instructions 124 may select an arbitration timeout time for a given task based on a priority attribute of the given task, a retry status attribute of the given task (at the time of the selection), or a combination thereof. For example, instructions 124 may have a set of predetermined arbitration timeout times that may be selected based on certain combinations of these attributes.

For example, for a task having a low priority attribute and a retry status of 0 (indicating that there have been 0 failed attempts to obtain bus access for this task since the task was last distributed to a bus queue), instructions 124 may select a relatively low arbitration timeout time for the task, such as 10 ms. Instructions 124 may select a lowest arbitration timeout time, among the predetermined timeout times, for tasks of low priority with 0 retries. In such examples, for a task having a high priority attribute and a retry status of 0, instructions 124 may select a higher arbitration timeout time for the task (e.g., 25 ms), which may be higher than for a low priority task with a retry status of 0, but lower than a task that has a retry status greater than 0.

In some examples, the greater the retry status for a task, the higher the arbitration timeout time instructions 124 may select for that task. For example, for a task with a retry status of 1, instructions 124 may select an arbitration timeout time of 100 ms, and for a task with a retry status of 2, instructions 124 may select an arbitration timeout time of 1 second, and the like. In some examples, instructions 124 may select different arbitration timeout times based on the priority attribute when the retry status is above 0, or may select arbitration timeout times based on the retry status alone (regardless of the priority attribute) when the retry status is greater than 0. Although various examples have been described herein for explanatory purposes, instructions 124 may select an arbitration timeout time for a task based on attributes of the task in any suitable manner.

Returning to the example of FIG. 1, as noted above, instructions 124 may begin processing of first task 160 including instructions 124 selecting a first arbitration timeout time for first task 160 based on attributes 171 of first task 160. In the examples described above, attributes 171 may include a priority of high, a retry status of 0, and as such instructions 124 may select a first arbitration timeout time of 25 ms for first task 160 based on those attributes (or any other suitable arbitration timeout time based on attributes 171 in other examples).

After instructions 124 select the first arbitration timeout time for first task 160, instructions 126 may request 182 access to first bus 130 from bus arbiter 135. As described above, master device 102 may then wait for a response to the request from bus arbiter 135, and instructions 126 may monitor whether the requested access is granted to master device 102 after the request before the lapse of the selected first arbitration timeout time (e.g., 25 ms). In some examples, master device 102 may wait for the requested access to be granted without processing any other task or doing other work apart from monitoring for the lapse of the arbitration timeout time since the bus access request (or sending additional requests for the bus in response to denial(s) as described above). In examples described herein, a determination that the selected first arbitration timeout time has lapsed without the master device receiving access to the first bus from the bus arbiter may include a determination that the selected first arbitration timeout time has lapsed without the master device receiving access to the first bus from the bus arbiter either after a single request (e.g., where the bus arbiter does not provide explicit denials of access) or after multiple requests for the same task within the same selected first arbitration timeout time from the first request for the bus (e.g., in response to explicit denials from a bus arbiter).

In some examples, first bus 130 may be busy, being in use by another master device of computing system 100 that was granted access before the request 182 of master device 102, for example. In some examples, first bus 130 may remain busy for the length of the first arbitration timeout time after the request 182. In such examples, instructions 126 may determine that the selected first arbitration timeout time (e.g., 25 ms) has lapsed (e.g., since the time of the request 182) without master device 102 receiving access to first bus 130 from bus arbiter 135.

In such examples, in response to the determination that the selected first arbitration timeout time has lapsed without master device 102 receiving access to first bus 130 from bus arbiter 135, instructions 128 may alter attributes 171 of first task 130, suspend processing of any tasks in the first bus queue 150 including the task 160, and access another one of the bus queues. Also in response to the determination, instructions 124 may begin processing a task at the front of the other bus queue.

For example, in response to the determination that the selected first arbitration timeout time has lapsed without master device 102 receiving the requested access to first bus 130 from bus arbiter 135, instructions 128 may alter attributes 171 of first task 130 to cause master device 102 to select a different arbitration timeout time for first task 130 when it is processed again by master device 102 (e.g., on a next loop through the sequence of the bus queues). For example, instructions 128 may change the retry status of attributes 171 from 0 to 1 (indicating that there has been 1 failed attempt to obtain bus access for this task since the task was last distributed to a bus queue), so that when instructions 124 again begin processing of task 160 again subsequently, the altered attributes may cause instructions 124 to select a different arbitration time for task 160 (e.g., 100 ms according to the example described above).

Also in response to the determination that the selected first arbitration timeout time has lapsed without master device 102 receiving the requested access to first bus 130 from bus arbiter 135 (and after altering the attributes in some examples), instructions 128 may suspend processing of any tasks in the first bus queue 150, including suspending processing of first task 160. In examples described herein, suspending processing of any tasks in a given bus queue may include ceasing to request or wait for access to be granted to the bus to which the given bus queue is dedicated. For example, in the example of FIG. 1, in response to the determination, instructions 121 will not immediately request access to first bus 130 again, either for the first task 160 or for any other task in first bus queue 150, and nor will instructions 121 immediately begin processing another task in bus queue 150 (e.g., including selecting an arbitration timeout time, for example). Rather, instructions 128 may suspend processing of all tasks in bus queue 150 (as described above) and then access another bus queue of master device 102.

For example, in response to the determination that the selected first arbitration timeout time has lapsed without master device 102 receiving the requested access to first bus 130 from bus arbiter 135, instructions 128 may access another one of the bus queues and instructions 124 may begin processing a task at the front of the other bus queue (if there is a task at the front of the other bus queue). For example, in response to the determination, instructions 128 may access second bus queue 152 dedicated to second bus 132 and including at least second task 162 at the front of bus queue 152. In such examples, instructions 124 may then begin processing of second task 162 at the front of second bus queue 152, where beginning the processing may include instructions 124 selecting a second arbitration timeout time for second task 162 based on attributes 173 of second task 162, as described above. In the examples described above, attributes 173 may include a priority of low, a retry status of 0, and as such instructions 124 may select a second arbitration timeout time of 10 ms for second task 162 based on those attributes (or any other suitable arbitration timeout time based on attributes 173 in other examples). In such examples, the first arbitration timeout time selected for first task 160, as described above, may be different than the second arbitration timeout time selected for second task 162, based on their different attributes. In other examples, the first and second arbitration timeout times may be the same (e.g., where their respective priority and retry status attributes are the same).

As described above, instructions 121 may iterate through all of the bus queues of master device 102 in a defined sequence a plurality of times, accessing each bus queue in turn and, at each bus queue, beginning processing of a task at the front of the bus queue. In the example of FIG. 1, the sequence of bus queues may include the first bus queue 150, followed by the second bus queue 152, and then followed by a sequence of any other bus queues of master device 102.

In such examples, after iteratively accessing each of the bus queues of master device 102 (i.e., to begin processing of any respective tasks at the front of the respective queues) instructions 124 may return to access the first bus queue 150. In the example described above in which bus access was not gained for task 160 within the first arbitration timeout time, when instructions 124 return to access the first bus queue 150, instructions 124 may return and restart processing of the first task 160 with selection of a third arbitration timeout time for first task 160, based on the altered attributes 171 of first task 160. In some examples, the third arbitration timeout time may be greater than the first arbitration timeout time previously selected for first task 160. For example, the altered attributes 171 may include a retry status of 1, as described above, and as such instructions 124 may select a third arbitration timeout time of 100 ms (according to the example described above).

As described above, instructions 121 may perform a plurality of loops through the sequence of bus queues, iteratively accessing each bus queue and, at each accessed bus queue, beginning processing a task at the front of the bus queue (if any), as described above. After the plurality of loops (which may be a predefined threshold number of loops), some or all of the bus queues may be empty, all of their tasks having been removed by the processing of instructions 121 described above. However, in some examples, at the end of the plurality of loops, task(s) from task list 140 may remain in some or all of the bus queues.

For example, in an example in which instructions 121 perform a predetermined threshold number of the loops, after iteratively accessing each of the bus queues of master device 102 the threshold number of times, instructions 122 may, for each of the bus queues, remove each task remaining in the bus queue from the bus queue. In some examples, depending on the task type attribute of the task, the task may be discarded, or the task may be returned to task list 140. For example, for each task remaining in any of the bus queues, instructions 122 may return the task to task list 140 when the attributes of the task indicate that it is a periodic task or a one-completion task, and instructions 122 may remove the task from the queue without returning it to task list 140 when the attributes of the task indicate that it is a one-attempt task. In some examples, when a task is removed uncompleted from a bus queue, instructions 122 may log or report an error related to the uncompleted task.

For example, when the attributes of the task indicate that it is a periodic task, instructions 122 may return the task to the task list 140 and set its state to the wait state and set its wait time equal to the periodic time attribute of the task. For periodic tasks, instructions 122 may also return the task to the task list 140 with altered attributes, as described above, when the task is completed successfully. In some examples, when the attributes of the task indicate that it is a one-completion task, instructions 122 may return the task to the task list 140 and set its state to the wait state and set its wait time equal to a periodic time attribute of the task (or in any other manner set the wait time to any other suitable time). In some examples, when a one-completion task is completed successfully, instructions 121 may remove the task from its bus queue and discard it. In some examples, when the attributes of the task indicate that it is a one-attempt task, at the end of the threshold number of iterations, instructions 122 may remove the task from the bus queue and discard it without returning it to the task list 140. For one-attempt tasks, instructions 122 may also remove the task from the bus queue and discard it the task is successfully completed.

As used herein, a "computing device" may be a controller, microcontroller, integrated circuit, server, enclosure (e.g., storage enclosure), desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, the at least one processing resource 110 may fetch, decode, and execute instructions stored on storage medium 120 to perform the functionalities described above in relation to instructions stored on storage medium 120. In other examples, the functionalities of any of the instructions of storage medium 120 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 1, storage medium 120 may be implemented by one machine-readable storage medium, or multiple machine-readable storage media.

In other examples, the functionalities described above in relation to instructions of medium 120 may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device at least partially implementing computing system 100 may include the at least one machine-readable storage medium storing the instructions and the at least one processing resource to execute the instructions. In other examples, the engines may be implemented by electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard-disk drive), a solid-state drive (SSD), any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

In some examples, instructions of medium 120 may be part of an installation package that, when installed, may be executed by processing resource 110 to implement the functionalities described above. In such examples, storage medium 120 may be a portable medium, such as a CD, DVD, or flash drive, or a memory maintained by a server from which the installation package can be downloaded and installed. In other examples, instructions of medium 120 may be part of an application, applications, or component(s) already installed on a computing device of computing system 100 including processing resource 110. In such examples, the storage medium 120 may include memory such as a hard-disk drive, solid-state drive, non-volatile memory device, or the like. In some examples, functionalities described herein in relation to FIG. 1 may be provided in combination with functionalities described herein in relation to any of FIGS. 2-4.

Figure 2:
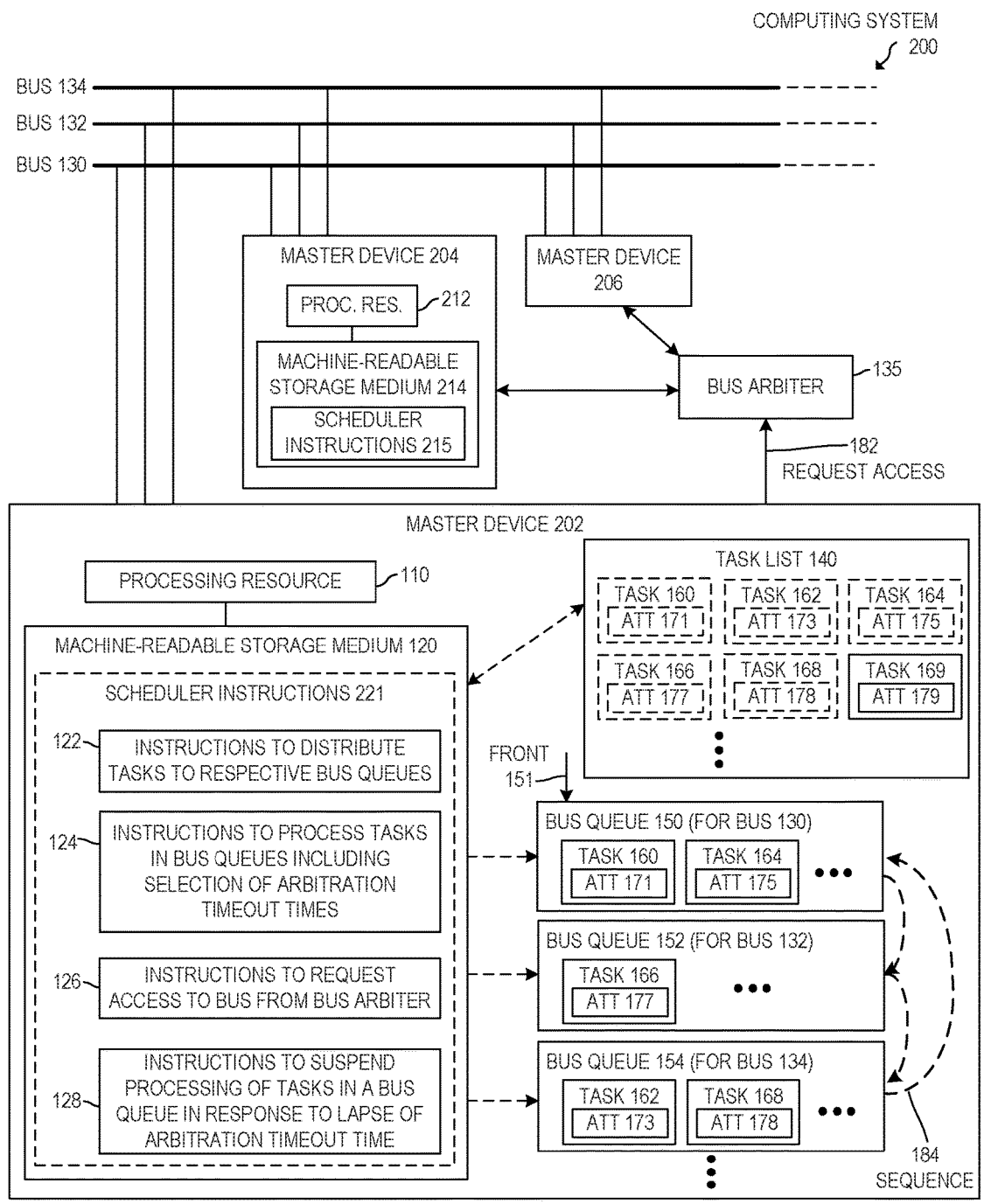
FIG. 2 is a block diagram of an example computing system including multiple master devices to distribute tasks among bus queues for respective busses of the computing system.

FIG. 2 is a block diagram of an example computing system 200 including multiple master devices to distribute tasks among bus queues for respective busses of the computing system 200. In the example of FIG. 2, computing system 200 may be implemented by at least one computing device. In some examples, the computing system 200 may be (or may be included in) a storage enclosure to house and manage storage devices, as described above in relation to the computing system 100 of FIG. 1.

Figure 3:
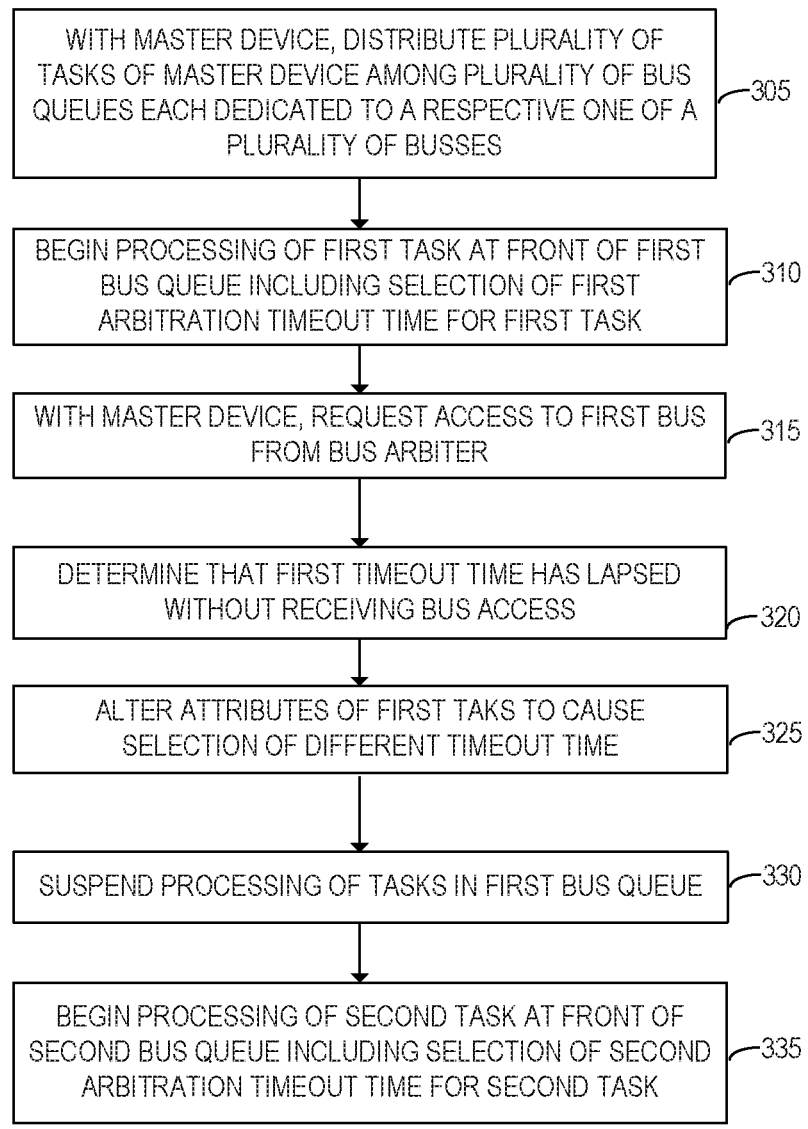
FIG. 3 is a flowchart of an example method of a computing system including distributing master device tasks among a plurality of bus queues for respective busses of the computing system.

In the example of FIG. 2, computing system 200 may include a plurality of busses (e.g., I²C busses or TWI busses) useable by each of master devices 202, 204, and 206. Each of master devices 202, 204, and 206 may be connected directly or indirectly (e.g., via a multiplexer, etc.) to the plurality of busses such that each of master devices 202, 204, and 206 is able to communicate via the busses with other device (e.g., slave devices) connected to the busses. The plurality of busses may include first and second busses 130 and 132, as described above in relation to FIG. 1, as well as a third bus 134. Each of master devices 202, 204, and 206 may be connected to each of the busses 130, 132, and 134 as described above. Although three busses are illustrated in FIG. 3, computing system 200 may include any number of two or more busses useable by the master device. Although three master devices are illustrated in FIG. 3 as connected to the busses of computing system 200, in some examples, computing system 200 may include any number of two or more master devices.

In the example of FIG. 2, master device 202 may include at least one processing resource 110, and at least one machine-readable storage medium 120, as described above in relation to FIG. 1. The at least one storage medium 120 may comprise (e.g., may be encoded with) scheduler instructions 221 that are executable by the at least one processing resource 110 to implement functionalities described herein in relation to FIG. 2. Scheduler instructions 221 may include at least instructions 122, 124, 126, and 128, as described above in relation to FIG. 1, and scheduler instructions 221 may implement a bus scheduler for master device 202.

As described above in relation to FIG. 1, the plurality of busses 130, 132, 134, etc., usable by master devices 202, 204, 206, etc., may each be used by one master device of computing system 100 at a time, and a bus arbiter 135 may arbitrate between the master devices. Bus arbiter 135 of computing system 200 may be implemented as described above in relation to computing system 100 of FIG. 1, and may communicate with each of master devices 202, 204, 206, etc., via communication channels (e.g., traces, wires, etc.) separate from the busses on which the master devices may communicate with the slave devices. As described above, master device is able to independently request access to a specified bus from bus arbiter 135, and bus arbiter 135 is able to decide whether to grant each received request.

As described above in relation to master device 102 of FIG. 1, master device 202 may include a task list 140 to store tasks that are each to be performed using one of the busses of computing system 200, and task list 140 may be stored in memory of master device 202. Master device 202 may store tasks to be performed in task list 140, as described above in relation to FIG. 1. As described above in relation to master device 102 of FIG. 1, master device 202 may include a plurality of bus queues, each for a respective one of the busses useable by master device 202 to communicate with slave devices in computing system 200. For example, in the example of FIG. 2, master device 202 may include a first bus queue 150 for first bus 130, a second bus queue 152 for second bus 132, and a third bus queue 154 for third bus 134. For purposes of explanation, example of FIG. 2 shows three busses and three bus queues of master device 202 for those three busses, respectively. However, in other examples, computing system 200 may include any number of two or more busses useable by master device 202, and may include a different respective bus queue for each of those busses. In some examples, each of the bus queues may be stored in memory of master device 202.

In the example of FIG. 2, tasks may be implemented as described above, and may include various attributes, as described above. For example, in the example of FIG. 2, master device 202 may store, in task list 140, a plurality of tasks including at least tasks 160, 162, 164, 166 168, and 169. Each of these tasks may include at least one respective command. Tasks 160, 162, 164, 166 168, and 169 may also include attributes 171, 173, 175, 177, 178, and 179, respectively. In examples, task list 140 may include any suitable number of tasks.

For tasks in task list 140, instructions 122 may periodically adjust or refresh the wait time attribute of each task, as described above in relation to FIG. 1. After each periodic adjustment, instructions 122 may detect any tasks whose adjusted wait times are 0 and, in response, may change the task state from the wait state to the ready state for those tasks. For example, after one or more wait time adjustments, instructions 122 may change the state from the wait state to the ready state for tasks 160, 162, 164, 166, and 168 (but not for task 169, for example).

In such examples, instructions 122 may determine that a plurality of tasks of task list 140 (i.e., tasks 160, 162, 164, 166, and 168) each have an attribute indicating that the task is currently ready for distribution to bus queues and processing (e.g., may have ready state attribute). In response to the determination, instructions 122 may distribute the plurality of tasks among the plurality of bus queues 150, 152 and 154, each dedicated to storing tasks for a respective one of the busses 130, 132, and 134. Instructions 122 may distribute the tasks among the bus queues, as described above in relation to FIG. 1. For example, instructions 122 may determine the bus identifiers of each of the plurality of tasks and distribute each of the tasks to the bus queue for the bus identified in the task. In the example of FIG. 2, attributes of tasks 160 and 164 may identify first bus 130, and instructions 122 may remove tasks 160 and 164 from task list 140 and distribute them to bus queue 150. In such examples, attributes of task 166 may identify second bus 132, and instructions 122 may remove task 166 from task list 140 and distribute it to bus queue 152. Also in such examples, attributes of tasks 162 and 168 may identify third bus 134, and instructions 122 may remove tasks 162 and 168 from task list 140 and distribute them to bus queue 154. In some examples, after the distribution of the plurality of tasks among the bus queues, and prior to beginning processing of any tasks distributed to the bus queues task, instructions 122 may sort the tasks in each of the bus queues, as described above.

After the distribution and the sorting, instructions 221 may iterate through all of the bus queues of master device 202 in a defined sequence a plurality of times, accessing each bus queue in turn and, for each accessed bus queue, attempting to process a task at the front of the bus queue (if any), as described above in relation to instructions 121 of FIG. 1.

For example, after the distribution, instructions 124 may iteratively access each bus queue of the plurality of bus queues according to a defined sequence 184, which may include looping back to access a first bus queue in the sequence after accessing a last bus queue in the sequence, as described above. For example, in the example of FIG. 2, the sequence of the bus queues may start with first bus queue 150, followed by second bus queue 152, and followed by third bus queue 154. In examples in which there are no further bus queues for master device 202, first bus queue 150 may follow third bus queue 154 in the sequence, forming a loop. In other examples in which there are additional bus queue(s) following bus queue 154, the sequence may return to first bus queue 150 after reaching the last of the bus queues.

As noted above, instructions 124 may iteratively access each bus queue of the plurality of bus queues according to the defined sequence 184, and at each access of a non-empty bus queue, certain processing described below may be performed by instructions 221. For example, at each access of a respective bus queue having a task at the front (such as task 160 at the front 151 of bus queue 150, for example), instructions 124 may begin processing the task at the front of the bus queue. In such examples, to begin the processing for at task at the front of an accessed bus queue, instructions 124 may select an arbitration timeout time for the task based on attributes of the task (as described above in relation to FIG. 1), and instructions 126 may request, from bus arbiter 135 for the task, access to the respective bus to which the respective bus queue is dedicated. For example, when instructions 221 access bus queue 150 when task 160 is at the front 151 of bus queue 150, instructions 124 may select an arbitration timeout time for task 160 based on attributes 171, as described above, and instructions 126 may request access to bus 130 for task 160 from bus arbiter 135.

In such examples, at one or some of these bus accesses, master device 202 may fail to obtain, from bus arbiter 135, requested access to a bus within the selected arbitration timeout time. In such examples, instructions 221 may suspend processing of the task and any other task in the respective bus queue, and advance to a next one of the bus queues for a next bus queue access. In some further detail, at an access of a respective bus queue having a task at a front of the bus queue, instructions 124 may begin processing of the task at the front of the bus queue (including selection of an arbitration timeout time for the task based on attributes of the task), and after the selection instructions 126 may request, from bus arbiter 135 for the task, access to the respective bus to which the respective bus queue is dedicated (e.g., bus 130 for a task in bus queue 150). In some examples, at this bus queue access, instructions 126 may determine that the selected arbitration timeout time has lapsed without the master device receiving the requested access to the bus from bus arbiter 135. In such examples, in response to the determination, instructions 128 may suspend processing of the task and any other task in the currently accessed bus queue and advance to a next one of the bus queues for a next bus queue access.

In other examples, at one or some of the bus accesses, master device 202 may obtain the requested bus access from bus arbiter 135 within the selected arbitration timeout time. In such examples, instructions 221 may cause a task at a front of the bus queue to be performed using the respective bus (e.g., including communication with a slave device over the bus), and then suspend processing of any other task in that bus queue and advance to a next one of the bus queues for a next access. In some further detail, at an access of a respective bus queue having a task at a front of the bus queue, instructions 124 may begin processing of the task at the front of the bus queue (with selection of an arbitration timeout time for the task based on attributes of the task), after the selection instructions 126 may request, from bus arbiter 135 for the task, access to the respective bus to which the respective bus queue is dedicated. In some examples, at this bus queue access, instructions 126 may determine that master device 202 has received access to the respective bus from the bus arbiter prior to lapse of the selected arbitration timeout time. In response to receiving that access, instructions 128 may cause the task to be performed using the respective bus and, once the task is complete or has failed to complete (including any retries), instructions 128 may suspend processing of any other task in the respective bus queue and advance to a next one of the bus queues for a next access. In such examples, when access to a bus is gained for a given task, once the task is attempted, instructions 221 may move to access the next bus queue.

After instructions 221 iterate through all of the bus queues of master device 202 in the defined sequence for the plurality of times (e.g., a predefined threshold number of time, such as 4 times, or any other suitable number), instructions 122 may, for each of the bus queues, remove each task remaining in the bus queue. For example, for each task remaining in any of the bus queues, instructions 122 may return the task to task list 140 when the attributes of the task indicate that it is a periodic task or a one-completion task, and instructions 122 may remove the task from the queue without returning it to task list 140 when the attributes of the task indicate that it is a one-attempt task, as described above in relation to FIG. 1.

In some examples, one or more other master devices of computing system 200 may have executable instructions equivalent to scheduler instructions 221 such that those other master device may perform the functionalities described above in relation to scheduler instructions 221. For example, master device 204 may comprise at least one processing resource 212 and at least one non-transitory machine-readable storage medium 214 comprising scheduler instructions 215 executable by the at least one processing resource 212 to perform the functionalities described above in relation to scheduler instructions 221. In such examples, scheduler instructions 215 of master device 204 are equivalent to the scheduler instructions 221 of master device 202.

In some examples, the functionalities described above in relation to instructions 221 or 215 may be implemented by one or more engines which may be any combination of hardware and programming to implement the functionalities of the engine(s), as described above. In some examples, functionalities described herein in relation to FIG. 2 may be provided in combination with functionalities described herein in relation to any of FIGS. 1, 3, and 4.

FIG. 3 is a flowchart of an example method 300 of a computing system including distributing master device tasks among a plurality of bus queues for respective busses of the computing system. Although execution of method 300 is described below with reference to computing system 100 of FIG. 1, other suitable systems for the execution of method 300 may be utilized (e.g., computing system 200 of FIG. 2). Additionally, implementation of method 300 is not limited to such examples.

At 305 of method 300, instructions 122 of master device 102 of computing system 100, when executed by a processing resource of master device 102, may distribute a plurality of tasks of master device 102 among a plurality of bus queues 150, 152, etc., each dedicated to a respective one of the busses 130, 132, etc., of computing system 110 that master device 102 may use to communicate with slave devices. In such examples, first bus queue 150 may be dedicated to first bus 130, and second bus queue 152 may be dedicated to second bus 132. After the distribution, at 310, instructions 124, when executed, may begin processing of a first task 160 at the front 151 of first bus queue 150, including selecting a first arbitration timeout time for the first task 160 based on attributes 171 of first task 160.

At 315, after the selection, instructions 126 of master device 102, when executed, may request access to first bus 130 from a bus arbiter 135 of computing system 100. At 320, instructions 126, when executed may determine that the selected first arbitration timeout time has lapsed without master device 102 receiving access to first bus 130 from bus arbiter 135. At 325, in response to the determination that the selected first arbitration timeout time has lapsed without master device 102 receiving access to first bus 130 from bus arbiter 135, instructions 128, when executed, may alter the attributes of first task 160 to cause master device 102 to select a different arbitration timeout time for first task 160 when processed again by master device 102. At 330, instructions 128, when executed, may suspend processing of any tasks in first bus queue 150, also in response to the determination. At 335, instructions 124, when executed, may begin processing of a second task 162 at the front of second bus queue 152, including selecting a second arbitration timeout time for second task 162 based on attributes 173 of second task 162.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1, 2, and 4.

Figure 4:
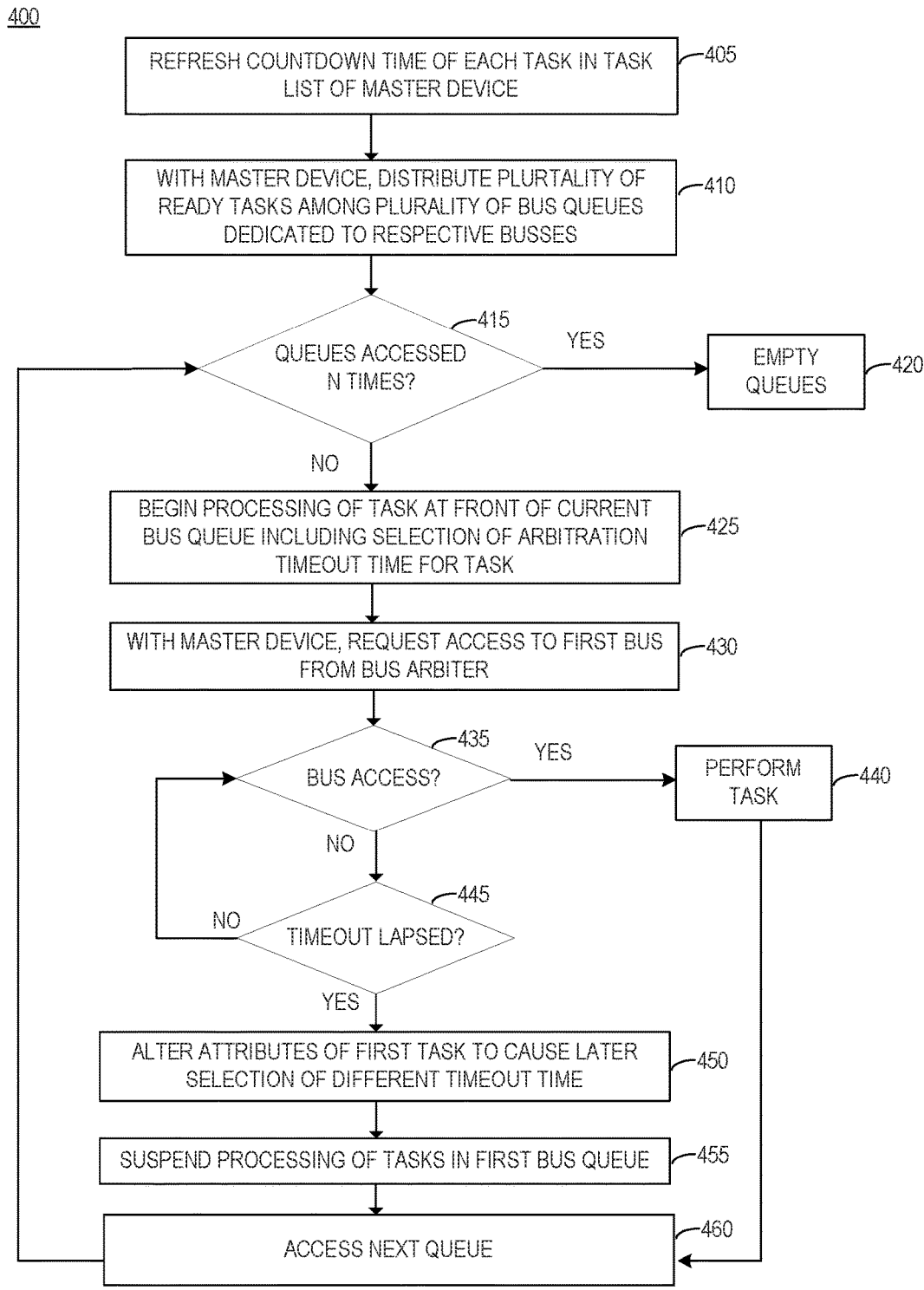
FIG. 4 is a flowchart of an example method of a computing system including requesting bus access a task at the front of bus queue for a master device.

FIG. 4 is a flowchart of an example method 400 of a computing system including requesting bus access a task at the front of bus queue for a master device. Although execution of method 400 is described below with reference to computing system 100 of FIG. 1, other suitable systems for the execution of method 400 may be utilized (e.g., computing system 200 of FIG. 2). Additionally, implementation of method 400 is not limited to such examples.

At 405 of method 400, instructions 122 of master device 102 of computing system 100, when executed by at least one processing resource 110 of master device 102, may adjust a wait time attribute of each task of a collection of tasks in a task list 140 of master device 102, as described above in relation to FIG. 1. At 410, instructions 122, when executed, may determine that a plurality of the tasks of the task list 140 (i.e., some or all of the collection of tasks) having an attribute indicating that the task is currently ready for distribution (e.g., ready state attribute, as described above). In such examples, at 410, instructions 122, when executed, may distribute, among the bus queues, each task of the collection having the attribute indicating that the task is currently ready for distribution. In such examples, each of the plurality of bus queues may be dedicated to a respective one of the busses, as described above. In some examples, at 410, after the distributing and prior to beginning processing of a first task, for each of the bus queues, instructions 122 may sort the tasks distributed to the respective bus queue based on respective priority attributes of the tasks, as described above.

As described above in relation to FIGS. 1 and 2, after the distribution and the sorting of tasks, instructions 121 of master device 102 may iterate through all of the bus queues of master device 102 in a defined sequence a plurality of times, accessing each bus queue in turn and, at each non-empty bus queue, requesting access to the appropriate bus from bus arbiter 135 for the task at the front of the bus queue. In such examples, instructions 121 may iterate through this defined sequence a predefined number of times (e.g., a threshold number of times), which may be represented by "N" herein.

In such examples, at 415, instructions 121 may determine whether the sequence of bus queues has been accessed "N" times. If not, then method 400 may proceed to 425, where instructions 124, when executed may begin processing of a first task 160 at the front 151 of the first bus queue 150 in the sequence. In such examples, beginning processing may include instructions 124 selecting a first arbitration timeout time for the first task 160 based on attributes 171 of the first task 160, as described above. Instructions 124 may begin this processing after the distributing of the tasks to the bus queues.

At 430, after selecting the first arbitration timeout time for the first task 160, instructions 126, when executed by master device 102, may request access to the first bus 130 from a bus arbiter 135 of computing system 100. At 435, instructions 126, when executed, may determine whether master device 102 has received the requested access to first bus 130. If so, then at 440, instructions 128 may cause the task to be performed on the acquired first bus 130 and then access the next bus queue in the sequence at 460. However, if master device 102 has not received the requested access to first bus 130, then instructions 126 may determine at 445 whether the selected first arbitration timeout time has lapsed without master device 102 receiving access to the first bus 130. If not, then method 400 may return to 435.

However, at 450, in response to a determination that the selected first arbitration timeout time has lapsed without master device 102 receiving access to first bus 130 from bus arbiter 135, instructions 128, when executed, may alter attributes 171 of first task 160 to cause master device 102 to select a different arbitration timeout time for first task 160 when processed again by master device 102 (e.g., in a next loop). Also in response to the determination, at 455, instructions 128 may suspend processing of any tasks in first bus queue 130 and, at 460, access the next bus queue in the sequence.

In such examples, method 400 may advance to 425 (when the bus queues have not been accessed "N" times), and at 425, instructions 124 may begin processing of a second task 162 at the front of second bus queue 152, beginning the processing including selecting a second arbitration timeout time for second task 162 based on attributes 173 of second task 162, as described above.

In examples in which processing of first task 160 was suspended because bus access was not obtained, after iteratively accessing each of the bus queues in the sequence, instructions 124 may restart processing of first task 160 in first bus queue 150 at 425. In such examples, instructions 124 may select a third arbitration timeout time for first task 160, based on the altered attributes of first task 160 and such that the third arbitration timeout time is greater than the first arbitration timeout time (as described above).

In some examples, instructions 122 may determine at 415 when of the bus queues has been accessed the threshold number of times (i.e., "N" times). In such examples, after iteratively accessing each of the bus queues the threshold number of times, instructions 122 may, for each of the bus queues, remove each task remaining in the bus queue at 420. In some examples, the removing may include instructions 122 returning, to task list 140, each task having attributes indicating that the task is a periodic task or a one-completion task and removing from the bus queue, without returning to task list 140, each task having attributes indicating that the task is one-attempt task.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. An article comprising at least one non-transitory machine-readable storage medium comprising instructions executable by at least one processing resource of a master device of a computing system having a plurality of buses useable by the master device, including first and second busses, wherein the instructions are executable to:
    adjust a wait time attribute of each task in a task list of the master device, the task list including a plurality of tasks each having an attribute indicating that the task is currently ready for distribution, wherein other tasks in the task list have an attribute indicating that the task is not ready for distribution;
    after the adjustment, determine that each of the plurality of tasks has the attribute indicating that the task is currently ready for distribution;
    distribute, among a plurality of bus queues, the plurality of tasks of the master device each having the attribute indicating that the task is currently ready for distribution, wherein each of the bus queues is for a respective one of the busses, and the bus queues include a first bus queue for the first bus and a second bus queue for the second bus;
    after the distribution, begin processing of a first task at a front of the first bus queue including selection of a first arbitration timeout time for the first task, based on attributes of the first task;
    request access to the first bus from a bus arbiter;
    in response to a determination that the selected first arbitration timeout time has lapsed without the master device receiving access to the first bus from the bus arbiter:
        suspend processing of any tasks in the first bus queue; and
        begin processing of a second task at a front of the second bus queue including selection of a second arbitration timeout time for the second task.

2. The article of claim 1, wherein the instructions further comprise instructions to:
    after the distribution and prior to beginning processing of the first task, for each of the bus queues, sort the tasks distributed to the respective bus queue based on respective priority attributes of the tasks.

3. The article of claim 1, wherein the instructions further comprise instructions to:
    in response to the determination that the selected first arbitration timeout time has lapsed without the master device receiving access to the first bus from the bus arbiter, alter the attributes of the first task to cause the master device to select a different arbitration timeout time for the first task when processed again by the master device.

4. The article of claim 3, wherein the instructions further comprise instructions to:
    after iteratively accessing each of the bus queues to begin processing of any respective tasks at the front of the respective queues, return to the first bus queue to restart processing of the first task, including selection of a third arbitration timeout time for the first task based on the altered attributes of the first task, wherein the third arbitration timeout time is greater than the first arbitration timeout time.

5. The article of claim 1, wherein each of the plurality of tasks comprises respective attributes, including priority and retry status attributes; and
    wherein each selection of an arbitration timeout time for a given one of the tasks is based on a combination of the priority and retry status attributes of the given task at the time of the selection.

6. The article of claim 1, wherein the first and second arbitration timeout times are different.

7. A computing system comprising:
    a plurality of master devices, including a given master device;
    a plurality of busses each useable by each of the plurality of master devices; and
    a bus arbiter;
    wherein the given master device comprises at least one processing resource and at least one non-transitory machine-readable storage medium comprising scheduler instructions executable by the at least one processing resource to:
        distribute a plurality of tasks of a master device among a plurality of bus queues, each dedicated to storing tasks for a respective one of a plurality of busses; and
        after the distribution, iteratively access each bus queue of the plurality of bus queues; and
        for at least one access of a respective bus queue having a task at a front of the respective bus queue:
            begin processing of the task at the front, including selection of an arbitration timeout time for the task based on attributes of the task;
            after the selection, request, from the bus arbiter for the task, access to the respective bus to which the respective bus queue is dedicated; and
            in response to a determination that the selected arbitration timeout time has lapsed without the master device receiving the requested access to the respective bus from the bus arbiter:
                suspend processing of the task and any other task in the bus queue; and
                advance to a next one of the bus queues for a next bus queue access; and
        after iteratively accessing each of the bus queues a threshold number of times, remove each task remaining in each of the bus queues, returning to a task list of the given master device each remaining task that is a periodic task or a one-completion task and without returning to the task list any remaining task that is a one-attempt task.

8. The computing system of claim 7, wherein:
the instructions to distribute are to distribute the plurality of tasks among the plurality of bus queues from the task list; and
wherein:
each remaining task having attributes that indicate that the task is a periodic task or a one-completion task, is returned to the task list; and
each remaining task having attributes that indicate that the task is a one-attempt task, are removed from the bus queues without being returned to the task list.

9. The computing system of claim 7, wherein the scheduler instructions are executable to, for at least one other access of a respective bus queue having a task at a front of the respective bus queue:
begin processing of the task at the front, including selection of an arbitration timeout time for the task based on attributes of the task;
after the selection, request, from the bus arbiter for the task, access to the respective bus to which the respective bus queue is dedicated; and
in response to receiving access to the respective bus from the bus arbiter prior to lapse of the selected arbitration timeout time:
cause the task to be performed using the respective bus;
suspend processing of any other task in the respective bus queue; and
advance to a next one of the bus queues for a next access.

10. The computing system of claim 7, wherein the scheduler instructions are executable to, for each access of a respective bus queue having a task at a front of the respective bus queue:
select an arbitration timeout time for the task, based on attributes of the task; and
request, from the bus arbiter and for the task, access to the respective bus to which the respective bus queue is dedicated.

11. The computing system of claim 7, wherein another master device of the plurality of master devices comprises:
at least one other processing resource; and
at least one other non-transitory machine-readable storage medium comprising scheduler instructions executable by the at least one other processing resource, wherein the scheduler instructions of the other master device are equivalent to the scheduler instructions of the given master device.

12. A method of a master device of a computing system having a plurality of busses useable by the master device, including first and second busses, the method comprising:
adjusting a wait time attribute of each task in a task list of the master device, wherein the task list comprises a plurality of tasks each having an attribute indicating that the task is currently ready for distribution and other tasks each having an attribute indicating that the task is not ready for distribution;
with a processor of the master device, distributing, among a plurality of bus queues, the plurality of tasks of the master device each having the attribute indicating that the task is currently ready for distribution, each of the bus queues dedicated to a respective one of the busses, the bus queues including a first bus queue dedicated to the first bus and a second bus queue dedicated to the second bus;
after the distributing, beginning processing of a first task at a front of the first bus queue, including selecting a first arbitration timeout time for the first task based on attributes of the first task;
after the selecting, the master device requesting access to the first bus from a bus arbiter of the computing system;
in response to a determination that the selected first arbitration timeout time has lapsed without the master device receiving access to the first bus from the bus arbiter:
suspending processing of any tasks in the first bus queue; and
beginning processing of a second task at a front of the second bus queue, including selecting a second arbitration timeout time for the second task based on attributes of the second task.

13. The method of claim 12, further comprising:
after iteratively accessing each of the bus queues, restarting processing of the first task in the first bus queue, including:
selecting a third arbitration timeout time for the first task, based on the altered attributes of the first task, wherein the third arbitration timeout time is greater than the first arbitration timeout time.

14. The method of claim 12, further comprising:
after the distributing and prior to beginning processing of the first task, for each of the bus queues, sorting the tasks distributed to the respective bus queue based on respective priority attributes of the tasks.

15. The method of claim 12, further comprising:
after iteratively accessing each of the bus queues a threshold number of times:
for each of the bus queues, removing each task remaining in the bus queue.

16. The method of claim 15, wherein, for each of the bus queues, the removing comprises:
returning to the task list each task having attributes indicating that the task is a periodic task or a one-completion task; and
removing from the bus queue, without returning to the task list, each task having attributes indicating that the task is one-attempt task.

17. The method of claim 12, further comprising:
in response to the determination that the selected first arbitration timeout time has lapsed without the master device receiving access to the first bus from the bus arbiter:
altering the attributes of the first task to cause the master device to select a different arbitration timeout time for the first task when processed again by the master device.

18. The article of claim 1, wherein the instructions further comprise instructions to:
after iteratively accessing each of the bus queues a threshold number of times, remove each task remaining in each of the bus queues, returning to a task list of the master device each remaining task that is a periodic task or a one-completion task and without returning to the task list any remaining task that is a one-attempt task.

* * * * *